United States Patent
Pilipski

(10) Patent No.: US 10,550,264 B2
(45) Date of Patent: Feb. 4, 2020

(54) ELEVATED GLASS-TRANSITION TEMPERATURE POLYMERIC POLYLACTIC ACID AND METHODS OF MAKING SAME

(71) Applicant: Mark Pilipski, Westbrookville, NY (US)

(72) Inventor: Mark Pilipski, Westbrookville, NY (US)

(*) Notice: Subject to any disclaimer, the term of this patent is extended or adjusted under 35 U.S.C. 154(b) by 0 days.

(21) Appl. No.: 15/971,369

(22) Filed: May 4, 2018

(65) Prior Publication Data

US 2018/0319978 A1     Nov. 8, 2018

Related U.S. Application Data

(60) Provisional application No. 62/502,412, filed on May 5, 2017.

(51) Int. Cl.
| | |
|---|---|
| C08L 67/04 | (2006.01) |
| C08K 3/22 | (2006.01) |
| C08J 3/20 | (2006.01) |
| B65D 85/804 | (2006.01) |
| C08F 10/06 | (2006.01) |

(52) U.S. Cl.
CPC .......... *C08L 67/04* (2013.01); *B65D 85/8043* (2013.01); *C08F 10/06* (2013.01); *C08J 3/203* (2013.01); *C08K 3/22* (2013.01); *C08J 2323/12* (2013.01); *C08J 2367/04* (2013.01); *C08J 2467/04* (2013.01); *C08K 2003/2206* (2013.01); *C08K 2201/018* (2013.01); *C08L 2203/10* (2013.01); *C08L 2203/12* (2013.01); *C08L 2203/14* (2013.01); *C08L 2205/025* (2013.01)

(58) Field of Classification Search
CPC .................................. C08F 10/06; C08L 67/04
See application file for complete search history.

(56) References Cited

U.S. PATENT DOCUMENTS

| | | | |
|---|---|---|---|
| 7,160,977 B2 | 1/2007 | Hale et al. | |
| 2008/0071015 A1 | 3/2008 | Kiuchi et al. | |
| 2012/0289625 A1* | 11/2012 | Matsuno | C07D 273/08 523/451 |
| 2017/0313839 A1* | 11/2017 | Guo | C08K 5/0066 |

OTHER PUBLICATIONS

Thermal Transitions of Homopolymers, Sigma Aldrich, Feb. 1, 2002 (Year: 2002).*
D. Battegazzore, et al.; Crystallization kinetics of poly(lactic-acid)-talc composites; eXPRESS Polymer Letters vol. 5, No. 10 (2011) pp. 849-858.
H. Li, et al.; Effect of nucleation and plasticization on the crystallization of poly(lactic acid); Polymer 48, 2007, pp. 6855-6866.

* cited by examiner

*Primary Examiner* — Christopher M Rodd
(74) *Attorney, Agent, or Firm* — Morgan, Lewis & Bockius LLP

(57) ABSTRACT

A novel thermoplastic material including polylactic acid (PLA) and calcium hydroxide is provided, the material having an elevated glass transition temperature ($T_g$). Methods of making this novel material, and articles of manufacture made from it are also provided.

10 Claims, No Drawings

ELEVATED GLASS-TRANSITION TEMPERATURE POLYMERIC POLYLACTIC ACID AND METHODS OF MAKING SAME

CROSS-REFERENCE TO RELATED APPLICATIONS

This application claims priority to U.S. Provisional Patent Application No. 62/502,412 filed May 5, 2017, which is incorporated herein by reference in its entirety.

FIELD OF THE INVENTION

The invention relates to a novel polymeric material including polylactic acid and calcium hydroxide, the material having an elevated glass transition temperature when compared to the base polylactic acid polymer. The invention further relates to methods for making and using such novel material.

BACKGROUND OF THE INVENTION

Plastic packaging, including broadly molded or formed plastics, may be manufactured from thermoplastic materials. Plastic packaging broadly includes various products and product lines, such as containers for food, solids and semi-solids of various compositions, water, beverages, hot and cold fluids of many kinds, medicines, powders, lotions, creams, agricultural substances and crops, dry and wet chemicals in wide varieties.

Plastic packaging may be produced from non-biodegradable materials. Owing to its nature of use, plastic packaging becomes relatively useless after the contents of the plastic packaging have served their intended purpose. Such spent plastic packaging is discarded after use. Polypropylenes (PP), polyethylenes (PE), and polystyrenes (PS) have high caloric values and upon incineration may damage contemporary incinerators. Polyvinyl chloride (PVC) upon incineration produces toxic gases. Landfill or ocean dumping of these plastic containers also has concomitant problems. These spent containers, made from plastics having high chemical stability, being mostly non-biodegradable, accumulate within landfills and into the waterways and oceans. A major negative side effect of such accumulation is that plastics may leach their chemical additives and molecular break-down products into the environment. Many of these chemical additives are smaller molecules than the original polymers, are toxic to life and interfere with the life-cycles of many organisms. The stability of the plastics used for the manufacture of containers and other items, means they cannot be safely and efficiently burned, they accumulate in the environment, thus, will overburden the landfills and mar the landscape, and they are a source of toxic effluents, leached into the environment.

In the manufacture of plastics and plastic items, the plastic industry is limited to and by the chemical and physical properties of the plastics/polymers. A variety of thermoplastic substances include yet are not limited to polylactic acids (PLA), polypropylenes (PP), polyethylenes (PE), polyesters, aliphatic polyesters, aromatic polyesters, polyolefins, polyvinyl chloride (PVC), polystyrene (PS), and/or polyethylene terephthalate (PET). Long chain molecules may be produced using reactions that incorporate simple 'sub-unit' molecules into the polymer by 'attaching,' e.g., forming a chemical bond, a sub-unit molecule to another subunit molecule thus forming a small portion of the final polymer. Reactions attach more sub-units to the growing chain, thus, forming a long chain polymer. Several different sub-unit molecules can also be incorporated to form a long chain polymer. The production of complex polymers may be limited only by the type of sub-unit molecules used and/or the type of chemical reactions employed to accomplish the creation of the final polymer.

Polymers exhibit one or more of the following physical and chemical characteristics: some have a low melting point, some have a high melting point, some are hard, some are soft, some are adhesive, some are non-adhesive, some are clear, some are opaque, some are flexible, and some are brittle. Specific polymers may be selected for the manufacture of specific items because the polymer's inherent characteristics are amenable to the manufacture of the specific item. For example; bags may be made from flexible plastics, so the bags will flex and become useful for carrying items within a bag, non-stick pots and pans may be coated with plastics that are essentially non-adhesive, such that foodstuffs do not stick to the pots and pans, permitting easy cleaning, also, clear plastics may be used for packaging so that the intended contents of the package are visible.

Industrial practice has shown that the combination of two or more types of polymers may produce a thermoplastic with characteristics intermediate to the original polymers. Sometimes, while the mixing of two or more polymer types may demonstrate some desired intermediate characteristic, such as a specific viscosity of the melted polymer mixture, another unwanted characteristic may emerge, such that the mixture of two or more polymer types may exhibit, upon cooling, a brittleness, not found in either or any of the original polymer types added to form the mixture.

Industrial practice has found that other compounds may also impart physical and chemical characteristics whenever are blended with polymers. Such additives are commonly included in the production of thermoplastic polymer resins, and include for example compatibility agents, the presence of which permit two or more dissimilar or incompatible polymers to be blended and form a reasonably uniform material, stabilizers, antioxidants, UV absorbers, antistatic agents, conductive agents, foaming agents, nucleating agents, pigmenting agents, melt agents added to lower the melting characteristics of particular thermoplastics, release agents, plasticizers, bulking agents, perfumes, and similar chemicals and materials within the entirety or part of the final product. The introduction of gas or gas bubbles into molten plastics is used to produce foam forms of said plastics. These processes alter the physical characteristics of the base resins. For example, the density of the foam form of any plastic is reduced compared to the solid form of the same plastic. A common example of this is polystyrene foam, often used as a non-biodegradable packing container or packaging fill. Many of these additives and additive agents are small molecules compared with the polymers, and many are toxic to biologic lifeforms. Some are carcinogenic to humans and other mammals, and over time these additives and additive agents leach out of the plastic polymer matrix of the manufactured items into the environment.

One solution to the above mentioned problems associated with the disposal of plastic items is the development of biodegradable plastics. Such plastic polymers would over time decompose into smaller naturally occurring molecules, such molecules being easily incorporated into the life-cycles of organisms without untoward toxic effects.

Polylactic acid is one such biodegradable polymer. The basic building block for this polymer is lactic acid, derived from plant sources not from petroleum sources. Several types of biodegradable polylactic acid polymers are known.

They undergo hydrolysis over time whenever exposed to natural conditions found in earth and water. Thus, these polymers will not accumulate within landfills. They will decompose into harmless non-toxic molecules in landfills.

Polylactic acid plastics are low in heat resistance and generally exhibit low glass-transition temperatures making them generally unsuitable for use where the manufactured items may come in contact with elevated temperatures, such as hot foods, hot beverages, or boiling water. Storage and shipping conditions where elevated temperatures may occur have precluded the use of polylactic acid polymer items. Several methods and processes have been developed to make PLA more amenable to being used in thermoforming manufacturing. For example, molten PLA may be held at elevated temperatures in a mold while the polymer slowly crystallizes. In some embodiments, this method requires heat expenditure to warm the mold along with longer 'dwell' times within the mold, to impart some heat resistance to the product made from PLA. The additional heat and manufacturing time may raise the cost of manufacturing using this method. Annealing of the manufactured item (e.g., post-crystallizing annealing) can also be used. This method, however, also an additional manufacturing step, requires additional heating and often, if incorrectly applied, causes the manufactured items to physically deform. In some instances, holding the molded or post-mold PLA at elevated temperatures involves the spontaneous production of small spherical bodies within the PLA matrix rendering the manufactured product opaque. Thus, by using these methods, it is difficult to obtain a clear or transparent molded item.

Sheets of PLA and other polymers can be laminated together to produce a composite plastic material. Such methods require twice the manufacturing because they require the production of at least two sheets (one of PLA and one of the other polymer) to be laminated as one final sheet for use in the manufacture of a molded item.

With regard to plastics other than PLA, it was found that recycled mixtures of various plastics from domestic and commercial sources, owing to the variety of polymers from a recycled supply source, are not amenable to thermoforming specific manufactured items requiring a shaping, molding, or extrusion process. The physical mechanical characteristics, i.e., low strength, brittleness, low flexibility, high opacity, etc., of such recycled mixed plastics, are generally undesirable for the manufacture of thermoformed items. While the addition of compatibility agents, such as polystyrol and polybutadiene, can be used to improve the physical mechanical characteristics of such recycled mixtures of various plastics, although mechanically effective, renders the final mixture toxic because these compatibility agents are usually toxic and will leach into the environment, as the recycled plastics are once again in a landfill or improperly discarded into the environment.

Paper and other cellulosic materials are also used as packaging materials for dry goods and under special conditions for liquid goods. Paper and paper products are typically considered to be biodegradable. Cellulose is a hygroscopic material; it absorbs water and many other liquid substances. The utility of paper to be used for the manufacture of containers to convey liquids is limited. Paper typically is manufactured in sheets. As such these sheets must be folded and often folds and edges of such paper sheets must be sealed to other folds and edges to produce a container. Each fold, each sealed seam, requires an extra production step and offers the possibility of structural failure. Additionally, often some plastic coating or laminate is added to the paper, to provide a barrier separating the paper from the potential contents of the container to enable such a paper container to carry liquids or other substances that might be absorbed by the paper alone. Such hybrid paper containers utilize the paper as a structural backbone and the plastic laminate or coating as the barrier for the container. Paper or cellulosic composites are not easily molded in the same manner as thermoformed plastics.

SUMMARY OF THE INVENTION

In one embodiment, there is a thermoplastic material including a polymer and an alkaline earth metal hydroxide. In one embodiment, the polymer is a condensation polymer. In an embodiment, the polymer is a polyester, a polyamide, or a polycarbonate. In an embodiment, the polymer is polylactic acid. In an embodiment, the polylactic acid (PLA) is D-PLA, L-PLA, or DL-PLA.

In an embodiment, the polylactic acid (PLA) comprises L-PLA and D-PLA. In an embodiment, the w/w ratio between L-PLA and D-PLA is about 99:1, about 98:2, about 97:3, about 96:4, about 95:5, about 94:6, about 93:7, about 92:8, about 91:9, about 90:10, about 89:11, about 88:12, about 87:13, about 86:14, about 85:15, about 84:16, about 83:17, about 82:18, about 81:19, about 80:20, about 79:21, about 78:22, about 77:23, about 76:24, about 75:25, about 74:26, about 73:27, about 72:28, about 71:29, about 70:30, about 69:31, about 68:32, about 67:33, about 66:34, about 65:35, about 64:36, about 63:37, about 62:38, about 61:39, about 60:40, about 59:41, about 58:42, about 57:43, about 56:44, about 55:45, about 54:46, about 53:47, about 52:48, about 51:49, about 50:50, about 49:51, about 48:52, about 47:53, about 46:54, about 45:55, about 44:56, about 43:57, about 42:58, about 41:59, about 40:60, about 39:61, about 38:62, about 37:63, about 36:64, about 35:65, about 34:66, about 33:67, about 32:68, about 31:69, about 30:70, about 29:71, about 28:72, about 27:73, about 26:74, about 25:75, about 24:76, about 23:77, about 22:78, about 21:79, about 20:80, about 19:81, about 18:82, about 17:83, about 16:84, about 15:85, about 14:86, about 13:87, about 12:88, about 11:89, about 10:90, about 9:91, about 8:92, about 7:93, about 6:94, about 5:95, about 4:96, about 3:97, about 2:98, or about 1:99.

In an embodiment, the polylactic acid has an average molecular weight of from about 100 kDa to about 160 kDa. In an embodiment, the polylactic acid has an average molecular weight of about 100 kDa. In an embodiment, the polylactic acid has an average molecular weight of about 110 kDa. In an embodiment, the polylactic acid has an average molecular weight of about 120 kDa. In an embodiment, the polylactic acid has an average molecular weight of about 130 kDa. In an embodiment, the polylactic acid has an average molecular weight of about 140 kDa. In an embodiment, the polylactic acid has an average molecular weight of about 150 kDa. In an embodiment, the polylactic acid has an average molecular weight of about 160 kDa. In an embodiment, the polymer is an addition polymer. In an embodiment, the polymer is polyethylene, polypropylene, polyacrylonitrile, or polyvinylchloride. In an embodiment, the polymer is polypropylene. In an embodiment, the polymer is a copolymer.

In an embodiment, the alkaline earth metal hydroxide is calcium hydroxide, magnesium hydroxide, or barium hydroxide. In an embodiment, the alkaline earth metal hydroxide includes calcium hydroxide.

In one embodiment, there is a thermoplastic material including polylactic acid (PLA) and calcium hydroxide. In one embodiment, the wt % concentration of calcium hydroxide in the material is from about 0.5% to about 3.0%. In one embodiment, the wt % concentration of calcium hydroxide in the material is from about 0.5% to about 1.0%. In one embodiment, the wt % concentration of calcium hydroxide in the material is from about 0.75% to about 1.25%. In one embodiment, the wt % concentration of calcium hydroxide in the material is from about 1.0% to about 1.5%. In one embodiment, the wt % concentration of calcium hydroxide in the material is from about 1.25% to about 2.0%. In one embodiment, the wt % concentration of calcium hydroxide in the material is from about 1.5% to about 2.25%. In one embodiment, the wt % concentration of calcium hydroxide in the material is from about 1.75% to about 2.5%. In one embodiment, the wt % concentration of calcium hydroxide in the material is from about 2.0% to about 2.75%. In one embodiment, the wt % concentration of calcium hydroxide in the material is from about 2.5% to about 3.0%. In an embodiment, the wt % concentration of calcium hydroxide in the material is about 0.50%. In an embodiment, the wt % concentration of calcium hydroxide in the material is about 0.75%. In an embodiment, the wt % concentration of calcium hydroxide in the material is about 0.85%. In an embodiment, the wt % concentration of calcium hydroxide in the material is about 1.0%. In an embodiment, the wt % concentration of calcium hydroxide in the material is about 1.15%. In an embodiment, the wt % concentration of calcium hydroxide in the material is about 1.25%. In an embodiment, the wt % concentration of calcium hydroxide in the material is about 1.35%. In an embodiment, the wt % concentration of calcium hydroxide in the material is about 1.5%. In an embodiment, the wt % concentration of calcium hydroxide in the material is about 1.75%. In an embodiment, the wt % concentration of calcium hydroxide in the material is about 2.0%. In an embodiment, the wt % concentration of calcium hydroxide in the material is about 2.15%. In an embodiment, the wt % concentration of calcium hydroxide in the material is about 2.35%. In an embodiment, the wt % concentration of calcium hydroxide in the material is about 2.5%. In an embodiment, the wt % concentration of calcium hydroxide in the material is about 2.75%. In an embodiment, the wt % concentration of calcium hydroxide in the material is about 3.0%. In an embodiment, the wt % concentration of calcium hydroxide in the material is about 1.0%.

In an embodiment, the material has a glass transition temperature ($T_g$) from about 140° F. to about 356° F. In an embodiment, the material has a glass transition temperature ($T_g$) from about 140° F. to about 265° F. In an embodiment, the material has a glass transition temperature ($T_g$) from about 225° F. to about 265° F. In an embodiment, the material has a glass transition temperature ($T_g$) up to about 356° F. In an embodiment, the material has a glass transition temperature higher than 212° F. In an embodiment, the material has a glass transition temperature ($T_g$) of about 140° F. In an embodiment, the material has a glass transition temperature ($T_g$) of about 150° F. In an embodiment, the material has a glass transition temperature ($T_g$) of about 160° F. In an embodiment, the material has a glass transition temperature ($T_g$) of about 170° F. In an embodiment, the material has a glass transition temperature ($T_g$) of about 180° F. In an embodiment, the material has a glass transition temperature ($T_g$) of about 190° F. In an embodiment, the material has a glass transition temperature ($T_g$) of about 200° F. In an embodiment, the material has a glass transition temperature ($T_g$) of about 210° F. In an embodiment, the material has a glass transition temperature ($T_g$) of about 220° F. In an embodiment, the material has a glass transition temperature ($T_g$) of about 235° F. In an embodiment, the material has a glass transition temperature ($T_g$) of about 240° F. In an embodiment, the material has a glass transition temperature ($T_g$) of about 245° F. In an embodiment, the material has a glass transition temperature ($T_g$) of about 247° F. In an embodiment, the material has a glass transition temperature ($T_g$) of about 250° F. In an embodiment, the material has a glass transition temperature ($T_g$) of about 252° F. In an embodiment, the material has a glass transition temperature ($T_g$) of about 255° F. In an embodiment, the material has a glass transition temperature ($T_g$) of about 260° F. In an embodiment, the material has a glass transition temperature ($T_g$) of about 265° F. In an embodiment, the material has a glass transition temperature ($T_g$) of about 270° F. In an embodiment, the material has a glass transition temperature ($T_g$) of about 273° F. In an embodiment, the material has a glass transition temperature ($T_g$) of about 275° F. In an embodiment, the material has a glass transition temperature ($T_g$) of about 280° F. In an embodiment, the material has a glass transition temperature ($T_g$) of about 300° F. In an embodiment, the material has a glass transition temperature ($T_g$) of about 325° F. In an embodiment, the material has a glass transition temperature ($T_g$) of about 350° F. In an embodiment, the material has a glass transition temperature ($T_g$) of about 356° F.

In one embodiment, there is a thermoplastic material including polypropylene and calcium hydroxide. In one embodiment, the wt % concentration of calcium hydroxide in the material is from about 0.5% to about 10%. In one embodiment, the wt % concentration of calcium hydroxide in the material is about 1.0%. In one embodiment, the wt % concentration of calcium hydroxide in the material is about 2.0%. In one embodiment, the wt % concentration of calcium hydroxide in the material is about 3.0%. In one embodiment, the wt % concentration of calcium hydroxide in the material is about 4.0%. In one embodiment, the wt % concentration of calcium hydroxide in the material is about 5.0%. In one embodiment, the wt % concentration of calcium hydroxide in the material is about 6.0%. In one embodiment, the wt % concentration of calcium hydroxide in the material is about 7.0%. In one embodiment, the wt % concentration of calcium hydroxide in the material is about 8.0%. In one embodiment, the wt % concentration of calcium hydroxide in the material is about 9.0%. In one embodiment, the wt % concentration of calcium hydroxide in the material is about 10.0%.

In one embodiment, there is an article of manufacture including a thermoplastic material including a polymer and an alkaline earth metal hydroxide. In one embodiment, the article is adapted to come in contact with a hot liquid. In one embodiment, an item molded or formed from the thermoplastic material has a minimal response to contact with a hot liquid. In one embodiment, an item molded or formed from the thermoplastic material has an undetectable response to contact with a hot liquid. In one embodiment, the article maintains substantially unchanged sharpness upon contacting a hot liquid. In one embodiment, the article maintains substantially unchanged rigidity upon contacting a hot liquid. In one embodiment, the article maintains substantially unchanged transparency upon contacting a hot liquid. In one embodiment, the article maintains substantially unchanged opacity upon contacting a hot liquid. In one embodiment, the article maintains substantially unchanged translucidity upon contacting a hot liquid. In one embodiment, the article maintains substantially unchanged physical properties upon contacting a hot liquid. In one embodiment, the article maintains substantially unchanged shape or form upon contacting a hot liquid. In one embodiment, the article does not substantially deform upon contacting a hot liquid. In one embodiment, the material can withstand contact with a hot liquid that has a temperature in excess of 150° F. In one embodiment, the material can withstand contact with a hot liquid that has a temperature in excess of 212° F. In one embodiment, the material can withstand contact with a hot liquid that has a temperature of about 212° F. In one embodiment, the article is a cup, a bowl, or a container. In one embodiment, the article is a piece of cutlery, for example a spoon, a fork, or a knife. In one embodiment, the article is a straw, for example a drinking straw. In one embodiment, the article is produced by 3D printing. In one embodiment, a thermoplastic material described herein can be used as a starting material in a 3D printing process, for example the thermoplastic material can be a PLA based filament for a 3D printer.

In one embodiment, there is a single use beverage cartridge including a base including a thermoplastic material including a polymer and an alkaline earth metal hydroxide, and a top. In one embodiment, the top and the base define an interior volume. In an embodiment, the beverage cartridge further includes a filter. In an embodiment, the cartridge is adapted to receive hot liquid. In one embodiment, the cartridge substantially holds its shape upon contact with a hot liquid. In one embodiment, the cartridge does not substantially deform upon contact with a hot liquid. In one embodiment, the cartridge can withstand contact with a hot liquid that has a temperature in excess of 150° F. In one embodiment, the cartridge can withstand contact with a hot liquid that has a temperature in excess of 212° F. In one embodiment, the cartridge can withstand contact with a hot liquid that has a temperature of about 212° F.

In one embodiment, there is a thermoplastic material including a polymer and an alkaline earth metal hydroxide, the material being more biodegradable that an otherwise substantially identical polymer that does not contain the alkaline earth metal hydroxide.

In one embodiment, there is a thermoplastic material including a polymer and an alkaline earth metal hydroxide, wherein the material is a film, a filament, or a foam.

In one embodiment, there is a process of making a thermoplastic material including a polymer and an alkaline earth metal hydroxide, the process including the steps of: melting an amount of polymer, and adding to the melted polymer an amount of alkaline earth metal hydroxide. In one embodiment, the resulting thermoplastic material has a glass transition temperature ($T_g$) higher than the $T_g$ of the polymer. In one embodiment, there is a process of making a thermoplastic material including a polymer and an alkaline earth metal hydroxide, the process including the steps of: mixing an amount of polymer with an amount of alkaline earth metal hydroxide, raising the temperature of the mixture, and extruding the mixture. In one embodiment, the resulting thermoplastic material has a glass transition temperature ($T_g$) higher than the $T_g$ of the polymer. In one embodiment, the polymer is polylactic acid. In an embodiment, the alkaline earth metal hydroxide is calcium hydroxide. In an embodiment, calcium hydroxide is added to the polymer in a wt % relative amount between about 0.5% and about 3.0%. In an embodiment, calcium hydroxide is added to the polymer in a wt % relative amount of about 0.5%. In an embodiment, calcium hydroxide is added to the polymer in a wt % relative amount of about 0.75%. In an embodiment, calcium hydroxide is added to the polymer in a wt % relative amount of about 1.0%. In an embodiment, calcium hydroxide is added to the polymer in a wt % relative amount of about 1.25%. In an embodiment, calcium hydroxide is added to the polymer in a wt % relative amount of about 1.5%. In an embodiment, calcium hydroxide is added to the polymer in a wt % relative amount of about 1.75%. In an embodiment, calcium hydroxide is added to the polymer in a wt % relative amount of about 2.0%. In an embodiment, calcium hydroxide is added to the polymer in a wt % relative amount of about 2.25%. In an embodiment, calcium hydroxide is added to the polymer in a wt % relative amount of about 2.5%. In an embodiment, calcium hydroxide is added to the polymer in a wt % relative amount of about 2.75%. In an embodiment, calcium hydroxide is added to the polymer in a wt % relative amount of about 3.0%. In an embodiment, the glass transition temperature ($T_g$) of the thermoplastic material is higher than the $T_g$ of the polymer by between about 10° F. and about 200° F. In an embodiment, the glass transition temperature ($T_g$) of the thermoplastic material is higher than the $T_g$ of the polymer by between about 25° F. and about 75° F. In an embodiment, the glass transition temperature ($T_g$) of the thermoplastic material is higher than the $T_g$ of the polymer by between about 50° F. and about 125° F. In an embodiment, the glass transition temperature ($T_g$) of the thermoplastic material is higher than the $T_g$ of the polymer by between about 75° F. and about 150° F. In an embodiment, the glass transition temperature ($T_g$) of the thermoplastic material is higher than the $T_g$ of the polymer by between about 100° F. and about 200° F. In an embodiment, the glass transition temperature ($T_g$) of the thermoplastic material is higher than the $T_g$ of the polymer by about 10° F. In an embodiment, the glass transition temperature ($T_g$) of the thermoplastic material is higher than the $T_g$ of the polymer by about 25° F. In an embodiment, the glass transition temperature ($T_g$) of the thermoplastic material is higher than the $T_g$ of the polymer by about 50° F. In an embodiment, the glass transition temperature ($T_g$) of the thermoplastic material is higher than the $T_g$ of the polymer by about 75° F. In an embodiment, the glass transition temperature ($T_g$) of the thermoplastic material is higher than the $T_g$ of the polymer by about 100° F. In an embodiment, the glass transition temperature ($T_g$) of the thermoplastic material is higher than the $T_g$ of the polymer by about 125° F. In an embodiment, the glass transition temperature ($T_g$) of the thermoplastic material is higher than the $T_g$ of the polymer by about 130° F. In an embodiment, the glass transition temperature ($T_g$) of the thermoplastic material is higher than the $T_g$ of the polymer by about 135° F. In an embodiment, the glass transition temperature ($T_g$) of the thermoplastic material is higher than the $T_g$ of the polymer by about 140° F. In an embodiment, the glass transition temperature ($T_g$) of the thermoplastic material is higher than the $T_g$ of the polymer by about 130° F. In an embodiment, the glass transition temperature ($T_g$) of the thermoplastic material is higher than the $T_g$ of the polymer by about 145° F. In an embodiment, the glass transition temperature ($T_g$) of the thermoplastic material is higher than the $T_g$ of the polymer by about 150° F. In an embodiment, the glass transition temperature ($T_g$) of the thermoplastic material is higher than the $T_g$ of the polymer by about 175° F. In an embodiment, the glass transition temperature ($T_g$) of the thermoplastic material is higher than the $T_g$ of the polymer by about 200° F. In one embodiment, the polymer is polypropylene and the alkaline earth metal hydroxide is calcium hydroxide, and the glass transition temperature ($T_g$) of the thermoplastic material is higher than the $T_g$ of the polypropylene by about 5%, about 6%, about 10%, about 15%, about 25%, about 50%, about 75%, about 90%, or about 100%. In one embodiment, the process includes an additional step of cooling the thermoplastic material to room temperature over a period of time.

In an embodiment, the glass transition temperature ($T_g$) of the thermoplastic material is from about 1% to about 150% greater than the $T_g$ of an otherwise substantially identically prepared thermoplastic material that does not contain the alkaline earth metal hydroxide. In an embodiment, the glass transition temperature ($T_g$) of the thermoplastic material is from about 1% to about 50% greater than the Tg of an otherwise substantially identically prepared thermoplastic material that does not contain the alkaline earth metal hydroxide. In an embodiment, the glass transition temperature ($T_g$) of the thermoplastic material is from about 25% to about 75% greater than the Tg of an otherwise substantially identically prepared thermoplastic material that does not contain the alkaline earth metal hydroxide. In an embodiment, the glass transition temperature ($T_g$) of the thermoplastic material is from about 50% to about 100% greater than the Tg of an otherwise substantially identically prepared thermoplastic material that does not contain the alkaline earth metal hydroxide. In an embodiment, the glass transition temperature ($T_g$) of the thermoplastic material is from about 75% to about 125% greater than the Tg of an otherwise substantially identically prepared thermoplastic material that does not contain the alkaline earth metal hydroxide. In an embodiment, the glass transition temperature ($T_g$) of the thermoplastic material is from about 100% to about 150% greater than the Tg of an otherwise substantially identically prepared thermoplastic material that does not contain the alkaline earth metal hydroxide. In an embodiment, the glass transition temperature ($T_g$) of the thermoplastic material is about more than 1% greater than the Tg of an otherwise substantially identically prepared thermoplastic material that does not contain the alkaline earth metal hydroxide. In an embodiment, the glass transition temperature ($T_g$) of the thermoplastic material is about 51% greater than the $T_g$ of an otherwise substantially identically prepared thermoplastic material that does not contain the alkaline earth metal hydroxide.

In one embodiment, there is a process of making a thermoplastic material including a polymer and an alkaline earth metal hydroxide including the additional step of annealing the thermoplastic material for a period of time to develop a desired $T_g$ of the thermoplastic material. In one embodiment, the period of time to develop a desired $T_g$ of the thermoplastic material is shorter than the corresponding period of time necessary for developing a substantially equivalent glass transition temperature ($T_g$) of a different thermoplastic material, wherein the different thermoplastic material is otherwise identically prepared except the different thermoplastic material does not contain the alkaline earth metal hydroxide.

In one embodiment, there is a method and chemistry to enable elevating the glass transition temperature of polymeric polylactic acid and other organic polymers, whether said polymers are biodegradable, recyclable, disposable, environmentally stable, and/or other categories of polymers, by the addition (admixture) and reaction of polylactic acid resin and calcium hydroxide. The resulting admixture leaving such biodegradable polymers biodegradable, such recyclable polymers recyclable, such disposable polymers disposable, and environmentally stable polymers environmentally stable.

In one embodiment, there is the use by incorporation or combination through addition, mixing, admixture, blending, reacting or some such combination of a substance or substances with characteristics giving the particles or molecules of such substance or substances the opportunity to associate with or bind to a thermoplastic polymer, this combination having the effect of raising the glass transition temperature of said polymer. In one embodiment, the resultant thermoplastic mixture is a combination of calcium hydroxide and the polymer polylactic acid. In an embodiment, the resultant thermoplastic mixture is a combination of calcium hydroxide and the polymer polypropylene. In an embodiment, the resultant thermoplastic mixture is used to form a foam product.

In one embodiment, there is the use by incorporation or combination through addition, mixing, admixture, blending, reacting or some such combination of a substance or substances with characteristics giving the particles or molecules of calcium hydroxide the opportunity to associate with or bind to an organic polymer, this combination having the effect of raising the glass transition temperature of said polymer.

In one embodiment, there is the use by incorporation or combination through addition, mixing, admixture, blending, reacting or some such combination of a substance or substances with characteristics giving the particles or molecules of calcium hydroxide the opportunity to associate with or bind to a thermoplastic polylactic acid polymer, this combination having the effect of raising the glass transition temperature of said polymer.

In one embodiment, there is the use by incorporation or combination through addition, mixing, admixture, blending, reacting or some such combination of a substance or substances with characteristics giving the particles or molecules of calcium hydroxide the opportunity to associate with or bind to a thermoplastic polypropylene polymer, this combination having the effect of raising the glass transition temperature of said polymer.

In one embodiment, there is a method of utilizing calcium hydroxide and polylactic acid to produce a polymeric resin demonstrating a glass transition temperature above that of the said polylactic acid alone.

In one embodiment, there is a method of utilizing calcium hydroxide and polypropylene to produce a polymeric resin demonstrating a glass transition temperature above that of the said polypropylene alone.

In one embodiment, there is the use by incorporation or combination through addition, mixing, admixture, blending, reacting or some such combination of a substance or substances with characteristics giving the particles or molecules of such substance or substances the opportunity to associate with or bind to said polymer this combination having the effect of raising the glass transition temperature of said polymer.

In one embodiment, there is the use of crystalline structures derived from calcium hydroxide acting as binding agents to hold relatively immobile portions of long chain polymers, having the effect of raising the glass transition temperature of said polymers.

In one embodiment, there is the addition of calcium hydroxide to a polymer having the effect of reducing the annealing time required for the polymer to organically crystallize, thus, altering the thermal and other physical characteristics of the polymer.

In one embodiment, there is the use by incorporation or combination through addition, mixing, admixture, blending, reacting or some such combination of a substance or substances with characteristics giving the particles or molecules of such substance or substances the opportunity to associate with or bind to a thermoplastic polymer, this combination having the effect of raising the glass transition temperature of said polymer, including yet not limited to the addition of naturally occurring polymers, such as, cellulose, any of the many starches; such as corn starch, arrowroot, modified starches, pectin and other similar polymers being biocompatible and biodegradable, to modify the physical characteristics of the base polymer(s) and the resultant mixture.

In one embodiment, there is the use by incorporation or combination through addition, mixing, admixture, blending, reacting or some such combination of calcium hydroxide or substances with characteristics giving the particles or molecules of such substance or substances the opportunity to associate with or bind to a thermoplastic polymer, this combination having the effect of raising the glass transition temperature of said polymer, including yet not limited to the addition of naturally occurring polymers, such as, cellulose, any of the many starches; such as corn starch, arrowroot, modified starches, pectin and other similar polymers being biocompatible and biodegradable, to modify the physical characteristics of the base polymer(s) and the resultant mixture.

In one embodiment, there is the use by incorporation or combination through addition, mixing, admixture, blending, reacting or some such combination of calcium hydroxide or substances with characteristics giving the particles or molecules of such substance or substances the opportunity to associate with or bind to a thermoplastic polylactic acid polymer, this combination having the effect of raising the glass transition temperature of said polymer, including yet not limited to the addition of naturally occurring polymers, such as, cellulose, any of the many starches; such as corn starch, arrowroot, modified starches, pectin and other similar polymers being biocompatible and biodegradable, to modify the physical characteristics of the base polymer(s) and the resultant mixture.

In one embodiment, there is the incorporation of inorganic molecular ceramic 'micro' structures, i.e., sized on, but not limited to, a $10^{-6}$ m scale, or 'nano' structures, i.e., sized on, but not limited to, a $10^{-9}$ m scale, with organic polymeric substances increasing the glass-transition temperature of the polymeric substances.

In one embodiment, there is the incorporation of calcium hydroxide formed inorganic 'micro' or 'nano' structures within an organic polymeric substance, having the effect of increasing the glass-transition temperature of the organic polymeric substance.

In one embodiment, there is the use of a mixture of calcium hydroxide and polylactic acid as a foamed product.

DETAILED DESCRIPTION

Described, herein, is the incorporation of a crystalline and/or amorphous complex within long chain polymers and plastics, thus altering the physical characteristics of the resulting admixture, enabling the use of various manufacturing techniques and the application of such an admixture to new uses. In one embodiment, the polymer is PLA. In some embodiments of the methods and processes described herein, the glass transition temperature of PLA is raised. In some embodiments, elevated glass transition PLA is used in the manufacture of various containers, (e.g., packets, cups, bottles, cartons, and boxes), thereby improving the ability of the containers to withstand the presence of hot beverages, hot foodstuffs, and imparting elevated storage temperatures without the containers deforming or melting. These methods and processes may also be applied for use with long chain polymers other than PLA.

In some embodiments, there is provided a method or process that raises the glass transition temperature of a long chain polymer. In some examples, thermoplastic resins such as PLA and polypropylene, and other long chain molecule have applicability to various embodiments. There is a need for thermoformed plastic containers that are non-toxic and biodegradable after use for transporting hot or cold, solid, semi-solid, and/or liquid substances. In some embodiments, PLA has several physical characteristics that make it an attractive polymer resin for use through thermoforming. PLA is useful in some embodiments in various forms, but may also have a relatively low range of melting point temperatures ($T_m$) and likewise exhibits a low glass transition temperature ($T_g$). In some embodiments, increasing PLA's $T_m$ and $T_g$ make the use PLA with increased $T_g$ more practical for containers or items that might experience temperatures in the range of hot foodstuffs, warm beverages, elevated storage temperatures, etc. A cup intended to hold hot coffee, or a beverage cartridge designed to brew a hot beverage, are just two examples of such a containers.

Definitions

For simple, small molecules, solvents, or substances, individually and clearly defined melting point, freezing point, and boiling point temperatures are generally understood. For very large molecules, such as polymers, such clearly defined temperatures, in particular melting point temperatures, cannot be determined, rather polymers typically exhibit a temperature interval during which polymers transition from solids to liquids. This interval is referred to as the 'glass transition' point' or the 'glass transition temperature' ($T_g$). As used herein, $T_g$ is the temperature range during which a polymer substance begins to soften yet not flow. As one skilled in the art understands, while $T_g$ is typically reported as a single value, a range of values may also be reported for a given polymer. For most organic polymers $T_g$ is seen as a temperature range, the lower temperature or lower limit of this range, being the temperature at which the polymer begins to absorb heat and deform, changing from a somewhat rigid substance to become a semi-rigid substance, the upper temperature or upper limit of this range is the temperature at which the polymer reduces its heat absorption yet does not melt until the melting point temperature has obtained. As such, the 'glass transition temperature' is not the melting point of any substance yet marks the beginning of a process that indicates something of the heat flow throughout the polymer. The 'melting point' for a substance is that temperature at which a substance begins to flow.

Experimental methods for determining $T_g$ are known in the art. For example, T can be determined using Differential Scanning calorimetry (DSC). This test is typically performed on thin samples of a polymer subjected to progressive increases or decreases in temperature, while the reflective nature of the polymer surface is compared with a similar polymer or standard reflective surface. The difference (differential) in reflectivity of the two surfaces is interpreted as being proportional to the heat absorbed by the polymer. A deflection in signal difference, as the temperature begins to increase marks the beginning of heat absorption by the polymer. This is called the lower limit of the $T_g$ range. As the temperature increases such a deflection tends to diminish. This point of signal diminution is labelled the upper limit of the $T_g$ range. The $T_g$ is often reported as the mid-range or peak point of such a deflection curve. As used herein, $T_g$ is substantially the midpoint of the $T_g$ interval as experimentally determined by DSC.

When ranges are used herein to describe, for example, physical or chemical properties such as molecular weight, relative amounts and/or concentrations, or chemical formulae, all combinations and subcombinations of ranges and specific embodiments therein are intended to be included. Use of the term "about" when referring to a number or a numerical range means that the number or numerical range referred to is an approximation within experimental variability (or within statistical experimental error), and thus the number or numerical range may vary. The variation can be from 0% to 5%, from 0% to 10%, from 0% to 15%, from 0% to 20%, from 0% to 25%, or the like, of the stated number or numerical range. The term "comprising" (and related terms such as "comprise" or "comprises" or "having" or "including") includes those embodiments such as, for example, an embodiment of any composition of matter, method or process that "consist of" or "consist essentially of" the described features.

1. Thermoplastic Materials

In one embodiment, there is a novel thermoplastic material. In one embodiment, the thermoplastic material may include a polymer and an alkaline earth metal hydroxide.

1a. The Polymer

The polymer can be a polyester, a polyamide, or a polycarbonate. In an embodiment, the polymer is polylactic acid, for example D-PLA, L-PLA, or DL-PLA. In an embodiment, the polylactic acid (PLA) includes L-PLA and D-PLA. The w/w ratio between L-PLA and D-PLA can be about 99:1, about 98:2, about 97:3, about 96:4, about 95:5, about 94:6, about 93:7, about 92:8, about 91:9, about 90:10, about 89:11, about 88:12, about 87:13, about 86:14, about 85:15, about 84:16, about 83:17, about 82:18, about 81:19, about 80:20, about 79:21, about 78:22, about 77:23, about 76:24, about 75:25, about 74:26, about 73:27, about 72:28, about 71:29, about 70:30, about 69:31, about 68:32, about 67:33, about 66:34, about 65:35, about 64:36, about 63:37, about 62:38, about 61:39, about 60:40, about 59:41, about 58:42, about 57:43, about 56:44, about 55:45, about 54:46, about 53:47, about 52:48, about 51:49, about 50:50, about 49:51, about 48:52, about 47:53, about 46:54, about 45:55, about 44:56, about 43:57, about 42:58, about 41:59, about 40:60, about 39:61, about 38:62, about 37:63, about 36:64, about 35:65, about 34:66, about 33:67, about 32:68, about 31:69, about 30:70, about 29:71, about 28:72, about 27:73, about 26:74, about 25:75, about 24:76, about 23:77, about 22:78, about 21:79, about 20:80, about 19:81, about 18:82, about 17:83, about 16:84, about 15:85, about 14:86, about 13:87, about 12:88, about 11:89, about 10:90, about 9:91, about 8:92, about 7:93, about 6:94, about 5:95, about 4:96, about 3:97, about 2:98, or about 1:99.

In an embodiment, the polylactic acid has an average molecular weight of from about 100 kDa to about 160 kDa. In an embodiment, the polylactic acid has an average molecular weight of about 100 kDa. In an embodiment, the polylactic acid has an average molecular weight of about 110 kDa. In an embodiment, the polylactic acid has an average molecular weight of about 120 kDa. In an embodiment, the polylactic acid has an average molecular weight of about 130 kDa. In an embodiment, the polylactic acid has an average molecular weight of about 140 kDa. In an embodiment, the polylactic acid has an average molecular weight of about 150 kDa. In an embodiment, the polylactic acid has an average molecular weight of about 160 kDa. In an embodiment, the polymer is an addition polymer. In an embodiment, the polymer is polyethylene, polypropylene, polyacrylonitrile, or polyvinylchloride. In an embodiment, the polymer is polypropylene. In an embodiment, the polymer is a copolymer.

Polylactic acid (PLA) is desirable as a thermoplastic for the manufacture of items, such as disposable containers, owing to its biodegradable and biocompatible nature. PLA may be produced from starch and the fermentation of sugars from sources such as corn and potato. In some embodiments, the raw materials for the production of PLA come from common agricultural crops and sources. As a polymer, PLA may be produced in various molecular sizes; including short chain polymers, as well as very long chain polymers. The physical characteristics of the short chain PLA differ from those of the long chain PLA. Likewise, there are differences in the physical characteristics of dextro-polylactic acid (D-PLA), levo-polylactic acid (L-PLA), and combinations of these isomeric polymers. Thus, there are multiple reported values for such physical characteristics as the melting point, the glass transition temperature, and the molecular weight, to name a few examples, for PLAs. Owing to the availability of several forms of PLA, PLA resins may be found to be a mixture of several various chain lengths as well as mixtures of D-PLA and L-PLA PLA polymers. Similarly, most other plastic polymers are typically mixtures of polymer chains of various lengths.

1b. The Alkaline Earth Metal Hydroxide

One embodiment incorporates the application of structural chemistry (the chemistry of molecular assemblies and of intermolecular bonds) to generally alter and adjust the physical characteristics of chemical compounds to produce plastics and other materials having desired characteristics, such as biodegradability, flexibility, and physical properties amenable to manufacturing, by including for example in a polymer an alkaline earth metal hydroxide. In some embodiments, the alkaline earth metal hydroxide is calcium hydroxide, magnesium hydroxide, or barium hydroxide.

Elevation of the glass transition temperature of polylactic acid can be effected for example, by addition of, and reaction with calcium hydroxide. In an embodiment, the material has a glass transition temperature ($T_g$) from about 125° F. to about 280° F. In an embodiment, the material has a glass transition temperature ($T_g$) from about 140° F. to about 280° F. In an embodiment, the material has a glass transition temperature ($T_g$) from about 140° F. to about 225° F. In an embodiment, the material has a glass transition temperature ($T_g$) from about 165° F. to about 235° F. In an embodiment, the material has a glass transition temperature ($T_g$) from about 200° F. to about 250° F. In an embodiment, the material has a glass transition temperature ($T_g$) from about 225° F. to about 265° F. In an embodiment, the material has a glass transition temperature ($T_g$) from about 210° F. to about 250° F. In an embodiment, the material has a glass transition temperature ($T_g$) from about 215° F. to about 275° F. In an embodiment, the material has a glass transition temperature ($T_g$) from about 235° F. to about 280° F. In an embodiment, the material has a glass transition temperature higher than 212° F.

In an embodiment, the thermoplastic material has a single digit ° F. glass transition temperature interval. In an embodiment, the thermoplastic material has a double digit ° F. glass transition temperature interval. In an embodiment, the thermoplastic material has a glass transition temperature interval from about 5° F. to about 100° F. In an embodiment, the thermoplastic material has a glass transition temperature interval of about 5° F. In an embodiment, the thermoplastic material has a glass transition temperature interval of about 10° F. In an embodiment, the thermoplastic material has a glass transition temperature interval of about 15° F. In an embodiment, the thermoplastic material has a glass transition temperature interval of about 20° F. In an embodiment, the thermoplastic material has a glass transition temperature interval of about 25° F. In an embodiment, the thermoplastic material has a glass transition temperature interval of about 30° F. In an embodiment, the thermoplastic material has a glass transition temperature interval of about 35° F. In an embodiment, the thermoplastic material has a glass transition temperature interval of about 40° F. In an embodiment, the thermoplastic material has a glass transition temperature interval of about 45° F. In an embodiment, the thermoplastic material has a glass transition temperature interval of about 50° F. In an embodiment, the thermoplastic material has a glass transition temperature interval of about 55° F. In an embodiment, the thermoplastic material has a glass transition temperature interval of about 60° F. In an embodiment, the thermoplastic material has a glass transition temperature interval of about 65° F. In an embodiment, the thermoplastic material has a glass transition temperature interval of about 70° F. In an embodiment, the thermoplastic material has a glass transition temperature interval of about 75° F. In an embodiment, the thermoplastic material has a glass transition temperature interval of about 80° F. In an embodiment, the thermoplastic material has a glass transition temperature interval of about 85° F. In an embodiment, the thermoplastic material has a glass transition temperature interval of about 90° F. In an embodiment, the thermoplastic material has a glass transition temperature interval of about 95° F.

In an embodiment, the alkaline earth metal hydroxide includes calcium hydroxide, which can be added to the thermoplastic material in concentrations from about 0.5% to about 3.0%, or from about 1.0% to about 5.0%. In some embodiments, the optimal concentration of alkaline earth metal hydroxide in the thermoplastic material is polymer dependent. For example, a concentration of alkaline earth metal hydroxide that works well in PLA may not work as well in a polyolefin. In some embodiments, the concentration of alkaline earth metal hydroxide in the thermoplastic material can be a single digit wt %, or a double digit wt %. In some embodiments, the concentration of alkaline earth metal hydroxide in the thermoplastic material can be up to 5%. In some embodiments, the concentration of alkaline earth metal hydroxide in the thermoplastic material can be above 5%. In some embodiments, the concentration of alkaline earth metal hydroxide in the thermoplastic material can be up to 7.5%. In some embodiments, the concentration of alkaline earth metal hydroxide in the thermoplastic material can be up to 10%.

In an embodiment, the concentration of calcium hydroxide in the thermoplastic material is about 0.5%. In an embodiment, the concentration of calcium hydroxide in the thermoplastic material is about 0.65%. In an embodiment, the concentration of calcium hydroxide in the thermoplastic material is about 0.80%. In an embodiment, the concentration of calcium hydroxide in the thermoplastic material is about 0.95%. In an embodiment, the concentration of calcium hydroxide in the thermoplastic material is about 1.0%. In an embodiment, the concentration of calcium hydroxide in the thermoplastic material is about 1.05%. In an embodiment, the concentration of calcium hydroxide in the thermoplastic material is about 1.10%. In an embodiment, the concentration of calcium hydroxide in the thermoplastic material is about 1.25%. In an embodiment, the concentration of calcium hydroxide in the thermoplastic material is about 1.40%. In an embodiment, the concentration of calcium hydroxide in the thermoplastic material is about 1.50%. In an embodiment, the concentration of calcium hydroxide in the thermoplastic material is about 1.60%. In an embodiment, the concentration of calcium hydroxide in the thermoplastic material is about 1.70%. In an embodiment, the concentration of calcium hydroxide in the thermoplastic material is about 1.80%. In an embodiment, the concentration of calcium hydroxide in the thermoplastic material is about 1.90%. In an embodiment, the concentration of calcium hydroxide in the thermoplastic material is about 2.0%. In an embodiment, the concentration of calcium hydroxide in the thermoplastic material is about 2.20%. In an embodiment, the concentration of calcium hydroxide in the thermoplastic material is about 2.40%. In an embodiment, the concentration of calcium hydroxide in the thermoplastic material is about 2.60%. In an embodiment, the concentration of calcium hydroxide in the thermoplastic material is about 2.80%. In an embodiment, the concentration of calcium hydroxide in the thermoplastic material is about 3.0%. In an embodiment, the concentration of calcium hydroxide in the thermoplastic material is about 3.2%. In an embodiment, the concentration of calcium hydroxide in the thermoplastic material is about 3.4%. In an embodiment, the concentration of calcium hydroxide in the thermoplastic material is about 3.6%. In an embodiment, the concentration of calcium hydroxide in the thermoplastic material is about 3.8%. In an embodiment, the concentration of calcium hydroxide in the thermoplastic material is about 4.0%. In an embodiment, the concentration of calcium hydroxide in the thermoplastic material is about 4.2%. In an embodiment, the concentration of calcium hydroxide in the thermoplastic material is about 4.4%. In an embodiment, the concentration of calcium hydroxide in the thermoplastic material is about 4.6%. In an embodiment, the concentration of calcium hydroxide in the thermoplastic material is about 4.8%. In an embodiment, the concentration of calcium hydroxide in the thermoplastic material is about 5.0%. In an embodiment, the concentration of calcium hydroxide in the thermoplastic material is about 1.0%.

In an embodiment, the glass transition temperature ($T_g$) of the thermoplastic material is from about 1% to about 150% greater than the Tg of an otherwise substantially identically prepared thermoplastic material that does not contain the alkaline earth metal hydroxide. In an embodiment, the glass transition temperature ($T_g$) of the thermoplastic material is from about 5% to about 50% greater than the Tg of an otherwise substantially identically prepared thermoplastic material that does not contain the alkaline earth metal hydroxide. In an embodiment, the glass transition temperature ($T_g$) of the thermoplastic material is from about 25% to about 75% greater than the Tg of an otherwise substantially identically prepared thermoplastic material that does not contain the alkaline earth metal hydroxide. In an embodiment, the glass transition temperature ($T_g$) of the thermoplastic material is from about 50% to about 100% greater than the Tg of an otherwise substantially identically prepared thermoplastic material that does not contain the alkaline earth metal hydroxide. In an embodiment, the glass transition temperature ($T_g$) of the thermoplastic material is from about 75% to about 125% greater than the Tg of an otherwise substantially identically prepared thermoplastic material that does not contain the alkaline earth metal hydroxide. In an embodiment, the glass transition temperature ($T_g$) of the thermoplastic material is from about 100% to about 150% greater than the Tg of an otherwise substantially identically prepared thermoplastic material that does not contain the alkaline earth metal hydroxide.

In an embodiment, the lower limit temperature of the glass transition interval of the thermoplastic material is from about 1% to about 150% greater than the lower limit temperature of the glass transition interval of an otherwise substantially identically prepared thermoplastic material that does not contain the alkaline earth metal hydroxide. In an embodiment, the lower limit temperature of the glass transition interval of the thermoplastic material is from about 25% to about 50% greater than the lower limit temperature of the glass transition interval of an otherwise substantially identically prepared thermoplastic material that does not contain the alkaline earth metal hydroxide. In an embodiment, the lower limit temperature of the glass transition interval of the thermoplastic material is from about 50% to about 75% greater than the lower limit temperature of the glass transition interval of an otherwise substantially identically prepared thermoplastic material that does not contain the alkaline earth metal hydroxide. In an embodiment, the lower limit temperature of the glass transition interval of the thermoplastic material is from about 75% to about 125% greater than the lower limit temperature of the glass transition interval of an otherwise substantially identically prepared thermoplastic material that does not contain the alkaline earth metal hydroxide. In an embodiment, the lower limit temperature of the glass transition interval of the thermoplastic material is from about 100% to about 150% greater than the lower limit temperature of the glass transition interval of an otherwise substantially identically prepared thermoplastic material that does not contain the alkaline earth metal hydroxide.

In one embodiment, there is a method that includes the addition through melting, mixing and reaction of substances having as a part of their reaction with PLA the effect of limiting or hindering the polymer's molecular movement, for example calcium hydroxide ($Ca(OH)_2$), to PLA resins, therefore producing a PLA mixture that demonstrates elevated Tg. The alteration and elevation of such physical characteristics of PLA make this molded PLA mixture able to tolerate elevated temperatures without deforming, as might be experienced by the untreated PLA resin.

Substances having this effect upon PLA and other polymers, as well, in various concentrations and mixtures, include yet are not limited to calcium hydroxide, and such other substances traditionally referred to as mortars and cements. In one embodiment, there is thus the fusion of ceramics and thermoplastic materials and technologies.

In one embodiment, using calcium hydroxide, crystalline structures are detected. In one embodiment, said crystals offer multiple binding sites, said sites contributing to an increase in such molecular binding referred to as 'molecular entrapment', 'Van der Waals' forces and/or 'hydrogen binding.' Likewise, said binding forces are often interpreted as 'nano-effects' owing to their operating within the nano-scale of molecular distances. Also, the presence of, in this example, calcium hydroxide, amplifies the polymer's natural tendency to 'crystallize.' As apparent to one skilled in the art, the 'crystallization' of polymer molecules is akin to, yet distinct from the inorganic crystallization of substances such as calcium hydroxide. There are present in some embodiments at least two types of crystalline structures; one such structure being an inorganic calcium compound based crystal, said crystal entrapping portions of the polymer; another such structure being an organic alignment of polymer chains.

Without wishing to be bound by any particular theory, it is believed that in some embodiments the presence of calcium hydroxide permits the polymer to form a convoluted alignment as the molecules of the polymer cool from a molten state. This new alignment, i.e., crystallization, can absorb heat without causing the molecules to deform, thus, elevating the glass-transition temperature. Also without wishing to be bound by any particular theory, it is believed that in some embodiments the presence of calcium hydroxide forms some micro or nano structures that enmesh or trap portions of the polymer molecules, forming some sort of 'clamp' having the effect of immobilizing the molecules, thus, elevating the glass-transition temperature. Also without wishing to be bound by any particular theory, it is believed that in some embodiments the presence of water molecules, whether resident in the resin or fostered by the presence of calcium hydroxide may be acting to allow the polymer molecules to align in a 'tighter' fashion than normally observed, thus, elevating the glass-transition temperature.

2. Methods of Use and Articles of Manufacture

In one embodiment, there is an article of manufacture including a thermoplastic material including a polymer and an alkaline earth metal hydroxide, for example an article adapted to come in contact with a hot liquid. In one embodiment, the material can withstand contact with a hot liquid that has a temperature in excess of 150° F. In one embodiment, the material can withstand contact with a hot liquid that has a temperature in excess of 212° F. In one embodiment, the material can withstand contact with a hot liquid that has a temperature of about 212° F. In one embodiment, the article is a cup, a bowl, or a plate. In one embodiment, the article is a piece of cutlery, for example a spoon, a fork, or a knife. In one embodiment, the article is a container, a packaging article, a coffee cups, a coffee brewing single use cartridge, or a coffee brewing multiple use cartridge.

In one embodiment, there is a single use beverage cartridge including a base including a thermoplastic material including a polymer and an alkaline earth metal hydroxide, and a top, and optionally a filter. In some embodiments, the cartridge is adapted to receive hot liquid, for example hot liquid with a temperature in excess of 150° F., or up to 212° F., about 212° F., or in excess of 212° F.

In one embodiment, the article is produced by 3D printing. In one embodiment, a thermoplastic material described herein can be used as a starting material in a 3D printing process, for example the thermoplastic material can be a PLA based filament for a 3D printer.

3. Methods of Production

In one embodiment, there is a process of making a thermoplastic material including a polymer and an alkaline earth metal hydroxide, the process including melting an amount of polymer, and adding to the melted polymer an amount of alkaline earth metal hydroxide, providing the resulting thermoplastic material having a glass transition temperature ($T_g$) higher than the $T_g$ of the polymer. In some embodiments, the process of making a thermoplastic material including a polymer and an alkaline earth metal hydroxide may include mixing an amount of polymer with an amount of alkaline earth metal hydroxide, raising the temperature of the mixture, and extruding the mixture, providing the resulting thermoplastic material having a glass transition temperature ($T_g$) higher than the $T_g$ of the polymer.

In one embodiment, there is a method using (e.g., through addition and reaction) molecules or substances, i.e., polymers and other molecules and molecular clusters, having reactivity due to their physical nature. In one embodiment, said reactivity may be the alteration or limiting movement of molecular structures of polylactic acid (PLA) or any long chain polymer. In one embodiment, calcium hydroxide ($Ca(OH)_2$) is added to alter the physical characteristics of thermoplastic polymers, specifically polylactic acid (PLA) and generally any long chain polymer.

Such methods of production may include for example mixing melted PLA resin pellets in an open container sitting on a hotplate, while having a rotating stirring rod keeping the resin in motion, as it melts. Once the resin is melted, powdered calcium hydroxide is added to the opened surface and mixed with the resin through the action of the stirring rod.

The methods may also include utilizing a screw extruder. PLA resin pellets are first mixed with the appropriate amount of calcium hydroxide by shaking the two materials together in a sealed container, and then the mixture of PLA pellets powdered with calcium hydroxide can be added to the feed hopper of the extruder. The extruder melts and mixes the ingredients, then pushes the resultant thermoplastic material out in a continuous flow.

In some embodiments, the methods of making include cooling, and/or annealing the thermoplastic materials from the melt/mix temperatures to room temperature, for example by passive cooling, and/or by active annealing. Passive cooling can be achieved by placing some material between two Teflon coated sheets separated by spacers, and then placing aluminum blocks over and under the Teflon coated sheets. In some embodiments, extended cooling times, i.e., annealing times, can be achieved. These extended times are obtained by placing the passive cooling assembly described above in a controlled temperature oven.

EXAMPLES

The following examples describe the invention in further detail. These examples are provided for illustrative purposes only, and should in no way be considered as limiting the invention.

Materials and Methods

The experiments were performed using PLA pellets provided by NatureWorks #3251D and #3001D. The PLA used had a molecular weight of about 160 kDa (160.000 grams/mol), or about 100 kDa (100.000 grams/mol), The PLA used was composed mostly of L-PLA with a small percent (4-10%) of D-PLA. Polypropylene was also used, i.e., ExxonMobil™ PP6262. Calcium hydroxide was used as commercially available (Sigma Aldrich #31219 calcium hydroxide, puriss. p.a., Reag. Ph. Eur., ≥96%, CAS Number 1305-62-0, Linear Formula $Ca(OH)_2$, Molecular Weight 74.09).

Three distinct mixing methods were independently used to combine PLA with calcium hydroxide. The first method entailed mixing melted PLA resin pellets in an open container sitting on a hotplate. The heat from the hotplate was distributed by immersing the container in a sand bath sitting atop the hotplate. A rotating stirring rod kept the resin in motion, as it melted. Once the resin was melted, the powdered calcium hydroxide was simply added to the opened surface and mixed with the resin through the action of the stirring rod.

The second mixing method utilized a small industrial Yellow Jacket™ screw extruder. PLA resin pellets were mixed with the appropriate amount of calcium hydroxide by shaking the two materials together in a sealed container and then the mixture of PLA pellets powdered with calcium hydroxide was added to the feed hopper of the extruder. The extruder melted and mixed the ingredients and pushed the resultant resin out in a continuous flow.

The third mixing method entailed dissolving the PLA resin in a test tube with dichloromethane (DCM) solvent, mixing the appropriate amount of calcium hydroxide, and shaking the stoppered test tube. The resultant mixture was then poured onto a flat Teflon sheet and allowed to evaporate under a vent hood.

In some embodiments, cooling from the melt/mix temperatures to room temperature was passive. In order to produce small thin strips of the resultant plastic for glass-transition temperature and melting point determinations, the molten effluent from the reaction vessel or extruder was placed between two Teflon coated sheets separated by spacers measuring 1/32 of an inch thick. Aluminum blocks were placed over and under the Teflon coated sheets. This assembly, from top to bottom, of block, Teflon sheet, molten resin between to uniform spacers, Teflon sheet, and block, was allowed to passively cool to room temperature.

In some embodiments, extended cooling times, i.e., annealing times, were tested. These extended times were obtained by placing the above described block assembly in a controlled temperature oven.

A method for evaluating glass-transition temperatures ($T_g$) used PLA samples milled into small flat sheets 1/32"×1/2"×1 1/4" in size. The strips were suspended, using Teflon clamps, almost horizontally in an oven. Their flat surfaces were parallel to the oven floor. Temperature was allowed to slowly increase in the oven while the strips were observed and video-recordings of the strips were made. When a strip began to droop or wilt, the temperature at which this occurred was noted as the lower beginning of the glass-transition temperature range. As the temperature increased in the oven such a strip would achieve an almost vertical position. The temperature at this point was called the upper end of the glass-transition temperature range. As the temperature in the oven increased the strip would ultimately flow and drip. This temperature was recorded as the melting point. The midpoint between the two temperature values was recorded as the $T_g$ of the particular material sample.

The method for evaluating glass-transition temperatures ($T_g$) and melting point temperatures ($T_m$) was correlated and validated by Differential Spectral calorimetry (DSC) measurements, and used throughout the experiments described herein.

Example 1: Addition of 0.5% to 2% $Ca(OH)_2$ to PLA

Amounts tested were from 0.5% to 3% by weight. 1% calcium hydroxide by weight was noted as the most beneficial for raising the glass-transition temperature. An example is the addition of approximately 1% by weight of Calcium Hydroxide to a molten quantity of PLA, allowing said mixture to mix thoroughly. Upon cooling the resultant plastic exhibits a glass transition temperature above that of the PLA alone without the additional substances.

One embodiment of the invention, therefore, includes the addition of 1% by weight of calcium hydroxide ($Ca(OH)_2$) to a molten polylactic acid (PLA). Samples of the molten polylactic acid (PLA) resin and samples of a molten mixture of calcium hydroxide ($Ca(OH)_2$) and polylactic acid (PLA) were allowed to cool for differing times to room temperature. The relative glass-transition temperatures ($T_g$) of said samples were determined. The results of these determinations are summarized in Table 1, showing that for each and every cooling period the addition of calcium hydroxide to the polylactic acid polymer resin facilitated an increase in the glass-transition temperature.

TABLE 1

| Entry | Time in minutes to cool from a molten state to room temperature | Glass-transition Temperature of Polylactic Acid resin (PLA) | Glass-transition Temperature of Polylactic Acid resin With 1% Calcium Hydroxide (Ca(OH)$_2$) |
|---|---|---|---|
| 1 | 2.5 m | 101° F. | 252° F. |
| 2 | 4.5 m | 107° F. | 240° F. |
| 3 | 8.5 m | 245° F. | 247° F. |

The "time in minutes to cool from a molten state to room temperature" is also known as "annealing time." In some instances, extended cooling time allows a polymer to form more stable amorphous crystalline structures within its matrix, thus, elevating its glass-transition temperature. Shown in the second column, is the effect of cooling/annealing time on untreated PLA. By allowing the polymer to slowly cool its normally low glass-transition temperature can be raised. The third column shows the effect of cooling/annealing time on PLA treated with 1% calcium hydroxide. The glass-transition temperature is elevated at every point in time. This shows that the amount of annealing time required to raise the glass-transition temperature of PLA is greatly reduced by treatment with calcium hydroxide.

Example 2: Mixing Temperature

In some embodiments, using both the first and second mixing method, the mixing temperature was held close to the melting temperature of the base PLA, for example just above the melting point of the PLA. When elevated temperatures were used, for example higher than 400° F., the calcium hydroxide destructively degraded the PLA.

Example 3: Addition of 2% Ca(OH)$_2$ to Polypropylene

One embodiment of the invention, therefore, includes the addition of 2% by weight of calcium hydroxide (Ca(OH)$_2$) to a molten polypropylene (PP). Addition of 2% calcium hydroxide to polypropylene resulted in an approximately 6% elevation in the glass-transition temperature over the base resin polypropylene.

All patents, patent applications, and published references cited herein are hereby incorporated by reference in their entirety. While the methods of the present disclosure have been described in connection with the specific embodiments thereof, it will be understood that it is capable of further modification. Further, this application is intended to cover any variations, uses, or adaptations of the methods of the present disclosure, including such departures from the present disclosure as come within known or customary practice in the art to which the methods of the present disclosure pertain.

The invention claimed is:

1. A thermoplastic material comprising a mixture of polylactic acid (PLA) and calcium hydroxide, wherein the mixture has a glass transition temperature (Tg) higher than 212° F., and wherein the wt % concentration of calcium hydroxide in the mixture is from about 1.0% to about 1.5%.

2. The thermoplastic material of claim 1, wherein the polylactic acid has an average molecular weight of from about 100 kDa to about 160 kDa.

3. The thermoplastic material of claim 1, wherein the wt % concentration of calcium hydroxide in the material is about 1.0%.

4. The thermoplastic material of claim 1, wherein the wt % concentration of calcium hydroxide in the material is about 1.5%.

5. The thermoplastic material of claim 1, wherein the material has a glass transition temperature ($T_g$) from about 212° F. to about 356° F.

6. The thermoplastic material of claim 1, wherein the material biodegrades more rapidly than an otherwise substantially identical polymer that does not contain calcium hydroxide.

7. The thermoplastic material of claim 1, wherein the material is a film, a filament, or a foam.

8. A single use beverage cartridge comprising a base comprising the thermoplastic material of claim 1, and a top, wherein the top and the base define an interior volume.

9. The single use beverage cartridge of claim 8, further comprising a filter, a sieve, or a screen, wherein the cartridge is adapted to receive a hot liquid having a temperature in excess of 150° F.

10. A process of making the thermoplastic material according to claim 1, the process comprising the steps of:
   mixing an amount of polylactic acid with an amount of calcium hydroxide, to form the mixture wherein the wt % concentration of calcium hydroxide in the mixture is from about 1.0% to about 1.5%.

* * * * *